US008249058B2

(12) United States Patent
Gallagher et al.

(10) Patent No.: US 8,249,058 B2
(45) Date of Patent: Aug. 21, 2012

(54) RAB TRIGGERING FOR MULTIMEDIA CALLS

(75) Inventors: Mark Gallagher, Berkshire (GB); Allan Baw, San Jose, CA (US)

(73) Assignee: SpiderCloud Wireless, Inc., San Jose, CA (US)

( * ) Notice: Subject to any disclaimer, the term of this patent is extended or adjusted under 35 U.S.C. 154(b) by 321 days.

(21) Appl. No.: 12/709,406

(22) Filed: Feb. 19, 2010

(65) Prior Publication Data

US 2011/0205977 A1 Aug. 25, 2011

(51) Int. Cl.
*H04L 12/66* (2006.01)
*H04L 12/28* (2006.01)

(52) U.S. Cl. .................................... 370/352; 370/401

(58) Field of Classification Search .......... 370/260–262, 370/328, 338, 352–356, 401
See application file for complete search history.

(56) References Cited

U.S. PATENT DOCUMENTS 7,813,492 B2 * 10/2010 Kauhanen et al. ............ 379/229
7,885,208 B2 * 2/2011 Mutikainen et al. .......... 370/260
2002/0120749 A1 8/2002 Widegren et al.
2004/0076145 A1 * 4/2004 Kauhanen et al. ............ 370/352
2005/0058125 A1 * 3/2005 Mutikainen et al. .......... 370/354
2005/0083909 A1 * 4/2005 Kuusinen et al. ............. 370/352
2007/0204050 A1 * 8/2007 Liu et al. ....................... 709/230
2008/0101347 A1 * 5/2008 Kauhanen et al. ............ 370/352
2009/0268726 A1 * 10/2009 Buckley et al. ............... 370/355

FOREIGN PATENT DOCUMENTS

WO WO 2007-069941 6/2007

OTHER PUBLICATIONS

International Search Report and Written Opinion dated Oct. 26, 2011 in application PCT/US2011/025516.

* cited by examiner

*Primary Examiner* — Hong Cho
(74) *Attorney, Agent, or Firm* — AlbertDhand LLP

(57) ABSTRACT

A system and method for establishing a multimedia session between a wireless user terminal and a network device. Embodiments include systems and methods for receiving a request from a wireless terminal initiating a call event to the network device; generating and sending a multimedia session invitation to a multimedia call control entity requesting a multimedia session with the network device; receiving a multimedia status message from the multimedia call control entity indicating the progress of initiating the multimedia session; and triggering setup of a radio access bearer to handle the multimedia session in response to the multimedia status message.

12 Claims, 10 Drawing Sheets

RAB TRIGGERING FOR MULTIMEDIA CALLS

TECHNICAL FIELD

The present invention relates generally to communication networks, and more particularly, some embodiments relate to SIP Triggering of a radio bearer for legacy handsets.

DESCRIPTION OF THE RELATED ART

The Internet, and with it, the Internet Protocol (IP), have become ubiquitous in modern society. According to Internet World Stats, the Internet boasts approximately 1.7 Billion users with a global penetration rate of almost 25%. With the steady increase in Internet popularity and utilization, users have become accustomed to having massive amounts of data at their fingertips, and have increasingly sought to extend multimedia content delivery to their mobile and handheld devices. In response to this massive consumer demand, the IP Multimedia Subsystem (IMS) has been proposed as an architecture for delivering IP multimedia services to handheld devices over cellular networks such as GSM based upon Internet protocols. It was originally proposed by the 3rd Generation Partnership Project (3GPP) wireless standards body as one avenue to allow wireless services to evolve beyond GSM. To ease the integration with the Internet, IMS generally uses IETF protocols such as, for example, Session Initiation Protocol (SIP). According to the 3GPP, IMS is not intended to standardize applications but rather to aid multimedia access from user terminals to create a form of Fixed Mobile Convergence (FMC).

While cellular communication systems were originally developed as circuit switched communication systems, packet based-communication in wireless networks is not new. The General Packet Radio System (GPRS), for example, was developed to enable packet-based communication in a GSM environment, and provides a number of additional services, including packet data communication to complement traditional circuit switched communications. In a GPRS system, Serving GPRS Support Nodes (SGSNs) and Gateway GPRS Support Nodes (GGSNs) can be implemented to provide a packet based infrastructure for network communications. The core network of the Universal Mobile Telecommunication System (UMTS) incorporates SGSNs and GGSNs to provide compatibility with GPRS.

The GGSN handles interworking between the GPRS network and external packet switched networks, such as the Internet, for example. The GGSN enables user terminal mobility in GPRS/UMTS networks and maintains routing to tunnel the Protocol Data Units (PDUs) to the SGSN servicing a given mobile station. Essentially, the GGSN acts as a router hiding the GPRS infrastructure from the Internet. When the GGSN receives data addressed to a mobile user, it checks if that user is active and if so, it forwards the data to the SGSN serving that mobile user. To accomplish this, the GGSN converts addresses of incoming data packets to the GSM address of the destination user and sends the readdressed packets to the responsible SGSN.

In the reverse direction, mobile-originated packets are routed to the right network by the GGSN. The GGSN converts GPRS packets coming from the SGSN serving the mobile user into the correct packet data protocol (PDP) format for the destination network (for example, into IP for transport via the Internet).

The SGSN delivers data packets to and from the mobile terminals (e.g., user equipment) within its determined service area. The SGSN performs packet routing and transfer, mobility and logical link management, and authentication and billing functions. The SGSN maintains location information and user profiles of registered GPRS users in a location register.

UMTS and GPRS systems utilize what are referred to as Radio Access Bearers (RABs) to provide a communication connection from the wireless terminals to the core network. To establish an IMS service, one UMTS signaling plane RAB and two UMTS user plane RABs are typically required. The UMTS signaling plane RAB supports UMTS signaling while one UMTS user plane RAB supports IMS signaling for the IMS service and the other user plane RAB supports user data communication. Techniques have been described in the past for UMA based DTAP to SIP conversion but UMA uses a WiFi (unlicensed spectrum) radio access network and is assisted by a client software process that assists the overall process.

As noted above, IMS as proposed uses Internet Engineering Task Force (IETF) protocols to provide compatibility with the Internet. An example of such a protocol is the Session Initiation Protocol. Traditionally, IMS handsets are configured to register on an IMS network directly but utilize a SIP based client to construct a suitable radio bearer for IMS communications. One of the challenges that wireless operators face is to transition their networks from WCDMA/HSPA networks supporting millions of legacy (for example, non-IMS) handsets to new IMS-based networks, so that legacy devices can attach and successfully connect to a SIP or IMS based infrastructure.

BRIEF SUMMARY OF EMBODIMENTS OF THE INVENTION

According to various embodiments described herein, systems and methods for establishing a radio bearer, or radio access bearer, for SIP, IMS, or like network communications are provided. In various embodiments, the systems and methods described herein provide a process and to build an operational SIP-based client within the network infrastructure so that a legacy (non-IMS or non-SIP) device can attach and successfully connect to a IMS based infrastructure using SIP or other like protocol. This reduces the cost of the deployment and extends the life of the existing network infrastructure. Particularly, some embodiments use a SIP trigger message from the IMS or other network to a serving controller to generate a radio bearer request that is used to trigger bearer setup between the user terminal and its base station. In some embodiments, the user terminal does not need to generate the bearer request nor does it need the ability to do so. Accordingly, legacy devices without this capability can be used to conduct SIP or other multimedia sessions.

According to an embodiment of the invention, systems and methods for establishing a multimedia session between a wireless user terminal and a network device, include a multimedia network controller receiving a request from a wireless terminal initiating a call event to the network device; the multimedia network controller generating and sending a multimedia session invitation to a multimedia call control entity requesting a multimedia session with the network device; the multimedia network controller receiving a multimedia status message from the multimedia call control entity indicating the progress of initiating the multimedia session; and the multimedia network controller triggering setup of a radio access bearer to handle the multimedia session in response to the multimedia status message. In one embodiment, the multimedia session is an IMS session between the wireless user terminal and the network device, and the IMS session uses a SIP messaging protocol. In a further embodiment, the multimedia status message includes a SIP 183 session progress message, and receipt of the SIP 183 session progress message triggers setup of the radio access bearer.

In various embodiments, the multimedia call control entity is an IP-PBX, an IMS core, a P-CSCF control entity or an IMS control entity. In another embodiment, the multimedia network controller includes a module to perform DTAP/SIP messaging, SIP/SIP messaging, RNAP/SIP messaging, or API/SIP messaging. Additionally, the network device can be a VOIP device, a PSTN device, a mobile device or an IMS device.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following Figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The Figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Embodiments of the present invention are directed toward a system and method for establishing a radio bearer, or radio access bearer, for SIP, IMS, or like network communications. In various embodiments, the systems and methods described herein provide a process and to build an operational SIP-based client within the network infrastructure so that a legacy (non-IMS or non-SIP) device can attach and successfully connect to a IMS based infrastructure using SIP or other like protocol. This reduces the cost of the deployment and extends the life of the existing network infrastructure. Particularly, some embodiments use a SIP trigger message from the IMS or other network to a serving controller to generate a radio bearer request that is used to trigger bearer setup between the user terminal and its base station. In some embodiments, the user terminal does not need to generate the bearer request nor does it need the ability to do so. Accordingly, legacy devices without this capability can be used to conduct SIP or other multimedia sessions.

Figure 1:
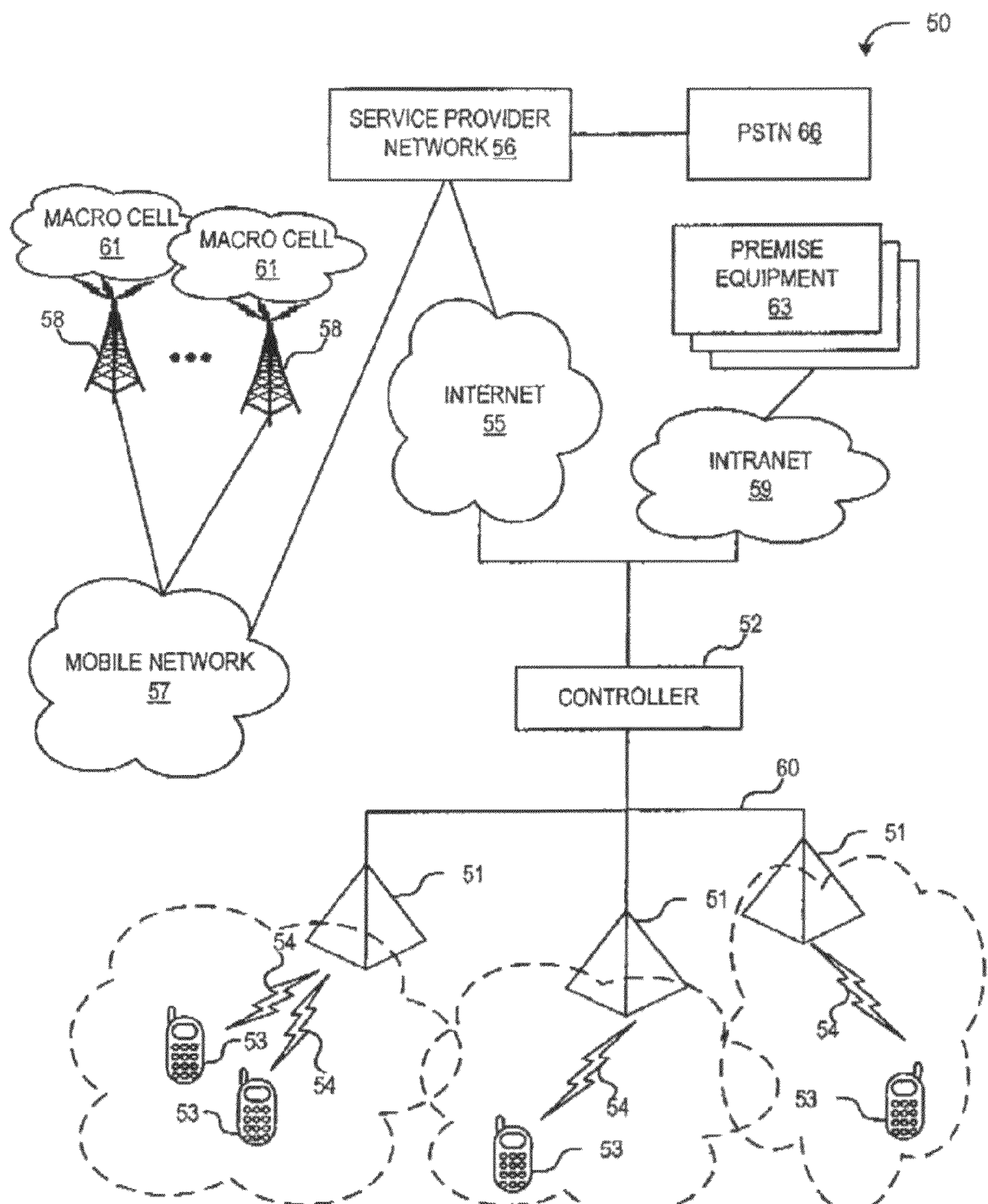
FIG. 1 is a diagram illustrating a simplified architecture for an example environment of the invention.

Before describing the invention in detail, it is useful to describe an example environment in which the invention can be implemented. One such example is that of a centrally-controlled femtocell system. FIG. 1 is a diagram illustrating a simplified architecture for such an example environment. In this example environment, one or more femtocells provide cellular coverage for wireless terminals. In some embodiments, wireless terminals can include handsets or other user equipment such as, for example cellular phones, smart phones, laptops, handheld communication devices, handheld computing devices, satellite radios, global positioning systems, PDAs, and/or any other suitable device for communicating over the wireless communication system.

In the illustrated example, femtocells 51 serve as base stations to provide cellular coverage over an air interface 54 to user equipment 53 within their respective areas of coverage. For example, femtocells 51 may be deployed at various locations within a building or other structure to provide cellular coverage to user equipment 53 within the building or structure. This can be advantageous, for example, in large buildings, underground facilities, within aircraft or other transportation vehicles, and within other structures and locations where conventional macro cell coverage is weak or insufficient. Femtocells can also be deployed in environments where it is desirable to augment the capacity of the conventional macrocellular network. Consider the case of a building with a plurality of femtocells distributed therein. In such an environment, the user equipment 53 registers with a femtocell 51 in its range within the building. As the user moves throughout the building, her cellular handset (or other terminal) may be handed off from one femtocell 51 to another to provide suitable coverage for her user equipment 53 as she moves within the building.

In various embodiments, user equipment 53 may comprise, for example, a cellular or mobile handset, a PDA having cellular system access, a laptop with cellular system access for data transmission over cellular systems, or other devices capable of accessing licensed spectrum communications networks for voice or data transmissions. In such applications, femtocells 51 are wireless access points configured to operate within the licensed spectrum to serve as base stations for the user equipment within their range. In other embodiments, femtocells 51 can be implemented as wireless access points for communications with compatible wireless terminals over proprietary or other non-licensed air interface. Although femtocells 51 are illustrated as exclusively wireless access points, embodiments can be implemented wherein femtocells 51 are implemented with wired interfaces to user equipment or a combination of wired and wireless interfaces.

As noted above, femtocell 51 operates as a base station and relays voice and data communication between the user equipment 53 and an end destination. For example, the end destination can be other user equipment within the building (for example, other wireless terminals 53, or other premise equipment 63), a cellular handset operating on a macro cell 61, the PSTN 66, Internet 55 accessible devices and so on.

In the illustrated environment, the femtocells 51 are centrally controlled by a controller 52, sometimes referred to as an access controller. Controller 52 may perform various functions, such as, for example, monitoring operations, coordinating communications among user equipment 53, relaying communications between user equipment 53 and other entities, licensed spectrum allocation, or load balancing amongst the femtocells 51. Femtocells 51 can be connected to access controller 52 via a backhaul 60 which can be implemented using a number of different communication topologies. The connections between the femtocells 51 and the access controller 52 could be dedicated, or the access points and controller could be coupled to one another via a switching network, such as a gigabit Ethernet network, for example.

Femtocells 51 are configured to provide cellular system access by transmitting voice and data transmissions to controller 52, which routes the communications via a packet switched network, such as the Internet 55, via an Intranet 59 or other communication path as appropriate. Accordingly, in some environments controller 52 may comprise a router or switch configured to allow the femtocells 51 to share a network connection and to access networks 55, 59. Controller 52 may also be configured to make routing determinations from among the various entities such that communications with a given wireless terminal 53 may be routed to at least one of the mobile network 57, other femtocells 51 other premise equipment 63 attached to the intranet 59, or other entities as may be accessible by controller 52.

In some examples, the system may further comprise a local intranet 56. For example, the controller 52 and femtocells 51 may be maintained by or integrated with an entity, such as a business or organization that also maintains its own local intranet 56. In some cases, users of the user equipment 53 may desire access to the intranet 56, such as for local data transfers or local voice calls. In such environments, the controller 52 may also mediate these communication activities.

The example environment further comprises a service provider network system 56. For example, the service provider network system may comprise a 2 G or 2.5 G network such as GSM, EDGE, IS-95, PDC, iDEN, IS-136, 3 G based network such as GSM EDGE, UMTS, CDMA2000, DECT, or WiMAX, or any other cellular or telecommunications or other network. Service provider network system 56 further comprises a cellular network 57 that can include mobile switching centers, base station controller and base stations 58 configured to provide macro cell coverage 61 in the environment.

Sometimes, the coverage area of macrocell 61 may overlap with that of femtocells 51, in such cases the controller 52 or the femtocells 51 may provide methods for mitigating interference between the elements. In some instances, user equipment 53 may move from areas covered by femtocells 51 to areas covered by macrocell 61. In these cases, the controller 52 may provide methods for handing off calls from the femtocells 51 to the macrocell 61. In other cases, the network system 56 or other network elements may mediate these transitions.

From time to time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

For example, the innovations described herein often refer to access points and access controllers. As would be apparent to one of ordinary skill in the art after reading this description depending on the nature of the innovation, various embodiments may implement these components as components of a femtocell network (such as the example described with reference to FIG. 1, or as other access point and controller elements (e.g., base stations and base station controllers) in macro cells, other radio access networks, or other like topologies. Additionally, in peer-to-peer environments, coordination and control mechanisms can be assigned to and distributed amongst the various peer elements, or certain peers may be designated as super peers with additional control mechanisms over the other peers. Super peers can be identified, for example, when the network configuration is mapped and network neighbors identified. Accordingly, access point and access controller functions can, in some embodiments, be distributed amongst peers, delegated to super peers, or shared amongst peers and super peers.

For instance, in standards-based 3GPP HSPA systems (UMTS Release 6), the infrastructure element access point or base station is referred to as a "NodeB," which can be referred to as Home NodeB, or HNB, for femtocell applications, which is known to those of one of ordinary skill in the art familiar with 3GPP systems. The serving NodeB is responsible for allocating a maximum transmit power resource to a wireless terminal (referred to as user equipment, user element or UE in UMTS specifications). In 3GPP LTE (Long Term Evolution) and like systems, uplink power control utilizes a closed-loop scheme around an open-loop point of operation. In 802.16 WiMAX systems, the serving base station is responsible for allocating an OFDMA resource element as well as potentially a maximum transmit power resource to the wireless terminal (called Subscriber Station or SS in the WiMAX specifications). Although many of the examples provided herein are described in terms of a UMTS application, after reading this description one of ordinary skill in the art will understand how these techniques can be implemented in alternative environments.

Although the environments described above can be characterized as a femtocell, macro cellular network or other like topological structure, the methods and apparatus described herein are also well suited to other scenarios, environments and applications, such as a wireless network or a system deployment that has no access controller but comprises distributed wireless access points, which can communicate in a peer-to-peer manner. The innovations described herein are not constrained by the actual choice of wireless protocol technology or network topology, but may be implemented across a wide range of applications as will be appreciated by one of ordinary skill in the art after reading this description.

The innovations described herein are applicable to licensed-spectrum-based cellular technologies in which infrastructure elements such as base stations or access points are provided as entities in the system with some level of coordination. In addition, the innovations are also applicable to unlicensed-spectrum with or without coordinating entities, including, for example, technologies such as WiFi and other technologies that employ peer-to-peer communication techniques.

In hierarchical systems, various functions described herein can be centralized in a control node such as a base station controller or access controller; distributed among like nodes such as base stations or access points; or distributed throughout the hierarchy in base stations and base station controllers. Also, the functions can be included in wireless terminals as well. However, a preferred embodiment relies on base stations or base station controllers to exchange information and instructions and can use wireless terminals in the manner designed for existing networks so as to avoid the need to update or modify existing wireless terminals or run a thin client on the terminals. For example, as certain of the below-described embodiments illustrate, the access points can be configured to instruct the wireless terminals to transmit known signals (such as pilot signals, for example); and can use existing control mechanism such as uplink power control. The systems can also be configured to take measurements of wireless terminal operations to make decisions to avoid, reduce or minimize interference. Other embodiments may place some of these control mechanisms on the wireless terminals or make other distribution of functionality than those examples described herein.

In peer-to-peer environments, coordination and control mechanisms can be assigned to and distributed amongst the various peer elements, or certain peers may be designated as super peers with additional control mechanisms over the other peers. Super peers can be identified, for example, when the network configuration is mapped and network neighbors identified.

Various innovations are described in this document in the context of an exemplary embodiment of the system, such as the example environment described above with reference to FIG. 1, which comprises multiple wireless access points, coupled to an access controller. The connections between the access points and the controller could be dedicated, or the access points and the controller could be coupled to one another via a switching network, such as a gigabit Ethernet network, for example. It should be noted that the innovations are also applicable to wireless system architectures that differ from the example environment and exemplary embodiments described herein, such as a completely distributed system that involves access points that can communicate between themselves in a peer-to-peer manner.

Figure 2:
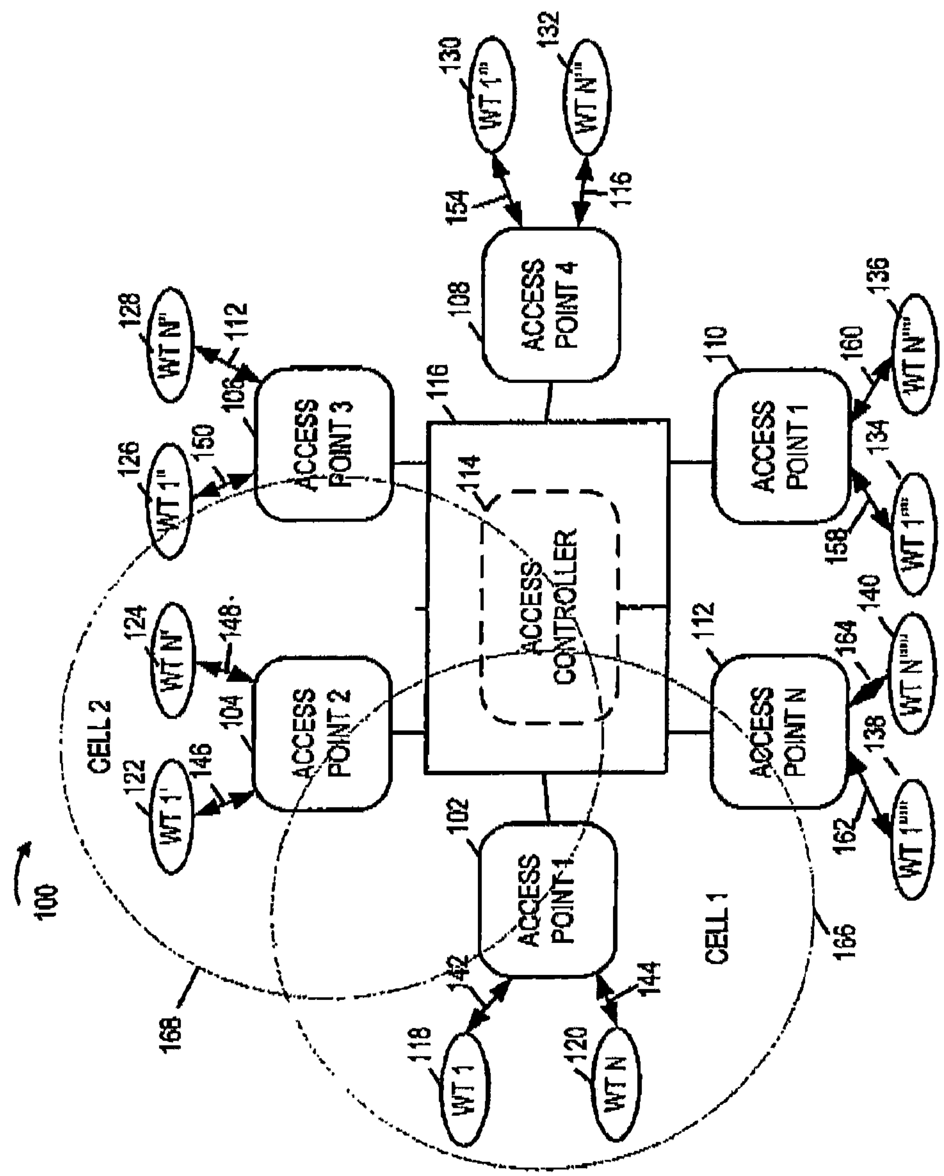
FIG. 2 is a diagram illustrating an example communication system in accordance with one embodiment of the invention.

FIG. 2 is a diagram illustrating an example communication system in accordance with one embodiment of the invention. The example illustrated in FIG. 1 depicts a cellular type of architecture, such as a femtocell or other cellular architecture, that includes a single access controller 114 that can be used to control and communicate with a plurality of access points 102, 104, 106, 108, 110 and 112. In this example, the access points 102, 104, 106, 108, 110, 112 are all wireless access points that communicate with a plurality of wireless terminals such as handsets, for example, or other wireless devices. Accordingly, the access points can each define a communication cell, an example of which can include a femtocell. To avoid excessive clutter in the drawings, only two cells 166, 168 are illustrated. Cell 1 166 illustrates an example coverage area for access point 102 and cell 2 168 illustrates an example coverage area for access point 104. As will be appreciated by one of ordinary skill in the art after reading this description, the other access points will also have corresponding areas of cell coverage.

The access points 102, 104, 106, 108, 110, 112 are communicatively coupled to access controller 114 by way of a backhaul 116. For example, in various embodiments, backhaul 116 can be implemented utilizing a communication network such as a packet-switched network. Likewise, alternative communication schemes or topologies can be implemented for backhaul 116. In some embodiments, access controller 114 is configured to coordinate or control at least some of the operations of at least some of the access points 102, 104, 106, 108, 110, 112. Likewise, access controller 114 can serve as a base station to relay communications among the access points 102, 104, 106, 108, 110, 112 (and ultimately their respective wireless terminals), as well as between the access points 102, 104, 106, 108, 110, 112 and their respective wireless terminals and other entities.

The access points 102, 104, 106, 108, 110, 112 are configured to communicate with wireless devices 118 . . . 140 within their respective cells. Such communications can comprise voice and data communications. Examples of wireless devices can include a cellular phone or other wireless terminal. Accordingly, at least some of the wireless terminals can be mobile devices that may move into and out of communication system 100 as well as within communication system 100. In FIG. 1, wireless terminals 118 . . . 120 are coupled to access point 102 via wireless links 142 . . . 144. Likewise, wireless terminals 122 . . . 124 are coupled to access point 104 via wireless links 146 . . . 148, and so on for the other access points 106, 108, 110, 112 as depicted in this example. In some embodiments, the geographical locations of the access points are known to the controller as well as to the access points.

FIG. 2 generally depicts a cellular architecture in which a plurality of cells or access points are distributed to provide coverage cells to the multiple wireless terminals in the coverage areas. The access points are under control and coordination of the access controller. Accordingly, FIG. 1 can represent a number of different communication architectures such as a femtocell architecture and a macro cell architecture. The various embodiments discussed below are described in terms of the components and topology illustrated in FIG. 1. However, after reading these descriptions, it will be apparent to one of ordinary skill in the art how these embodiments can be implemented with other architectures.

Figure 3:
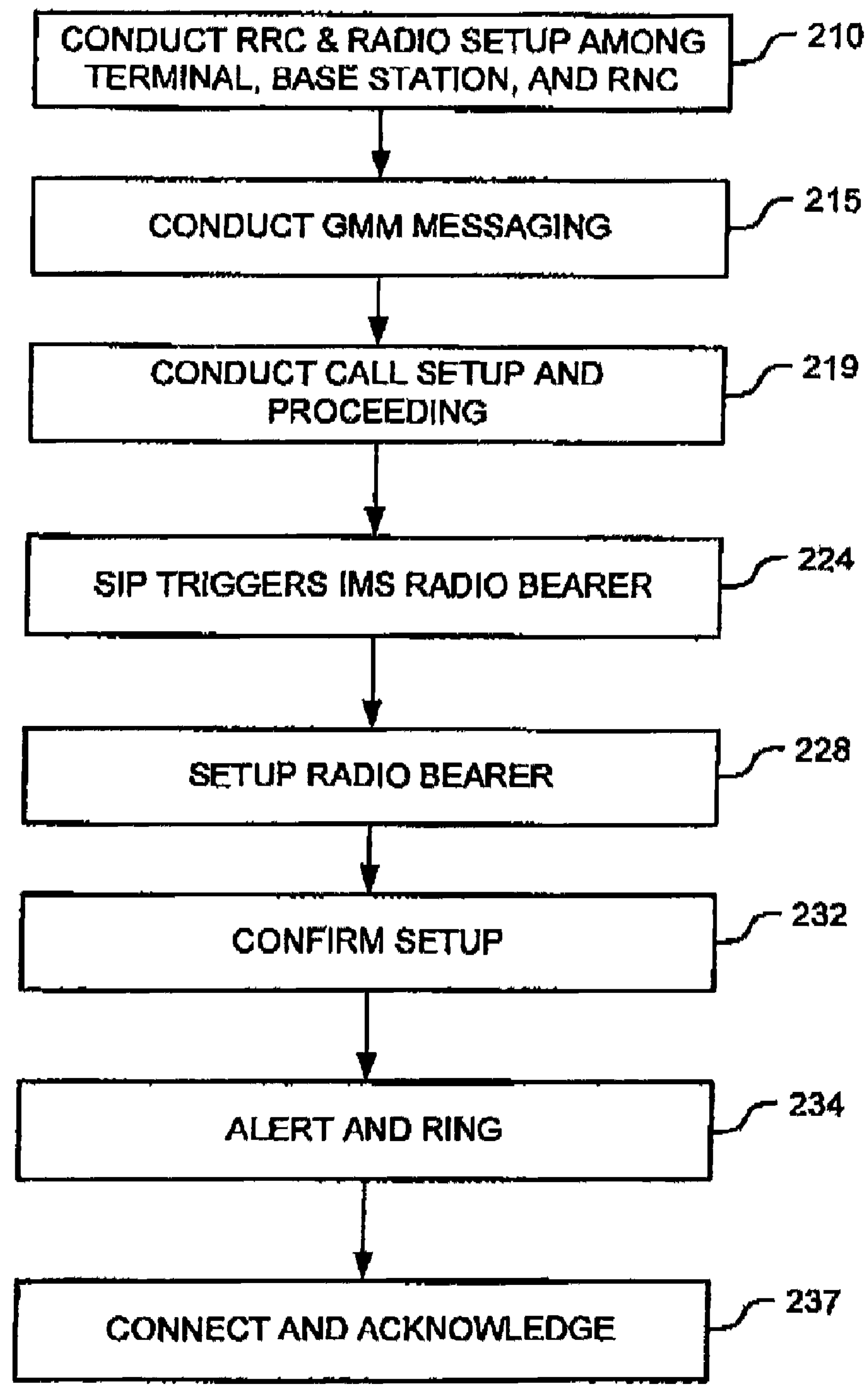
FIG. 3 is an operational flow diagram illustrating an example messaging flow in accordance with one embodiment of the invention.

FIG. 3 is an operational flow diagram illustrating an example messaging flow in accordance with one embodiment of the invention. Referring now to FIG. 3, in a step 210, 3 G radio resource control (RRC) and radio setup messages 312 are exchanged between the user terminal 53 and the radio network controller 52. In some embodiments, this can be accomplished using conventional RRC and radio setup messages. These are initiated between the user equipment 53 and the controller 52 and can be in accordance with RNC or NodeB protocols.

At operation 215, a GMM messaging sequence occurs. In one embodiment, this is between and among the user equipment 53, the radio network controller 52, and a GMM controller 77. UMTS and GPRS use a MM (Mobility Management) protocol to allow the mobility of user terminals. The protocol can allow the user equipment to inform the network of its present location and provide user identity confidentiality. A further function of the GMM layer provides connection management services to the different entities of the upper Connection Management (CM) sub-layer.

At operation 219, call setup and call proceeding message are exchanged to set up the call and the multimedia session. For example, for a SIP session, this can include SIP messaging between a SIP controller and a SIP control center, for example, along with messages between the SIP controller and the user equipment to establish the session.

At step 224, a multimedia status message triggers a radio bearer. For example, in one embodiment, a SIP 183 session progress message 335 from a SIP call controller to the SIP controller triggers a RAB (Radio Access Bearer) assignment request, which is sent to the radio network controller. At operation 232, this results in the exchange of radio bearer setup messages between the base station (e.g., base station or NodeB 51) and the radio network controller (e.g., controller 52) to establish the radio bearer, and a confirmation between the base station and the user terminal (e.g., handset 53) that the radio bearer has been set up. This is followed by a radio access bearer response to the SIP controller, which forwards a SIP progress message to the SIP call controller. An example of the SIP progress message is a SIP 183 message used when internetworking with the PSTN and allows the calling party to be notified of the status of the call.

This is followed at step 234 by an alert message from the controller to the user equipment and a ringing tone from the SIP call controller to the user equipment. At step 237, connect and acknowledge messages are exchanged to complete the sequence.

Accordingly, as described above, a SIP message, such as, for example, a SIP 183 trigger can be used to set up the radio bearer even for legacy mobiles. Other messages such as messages with the same SDP can be used to trigger the radio access bearer. One example of this is the SIP Invite message.

Figure 4:
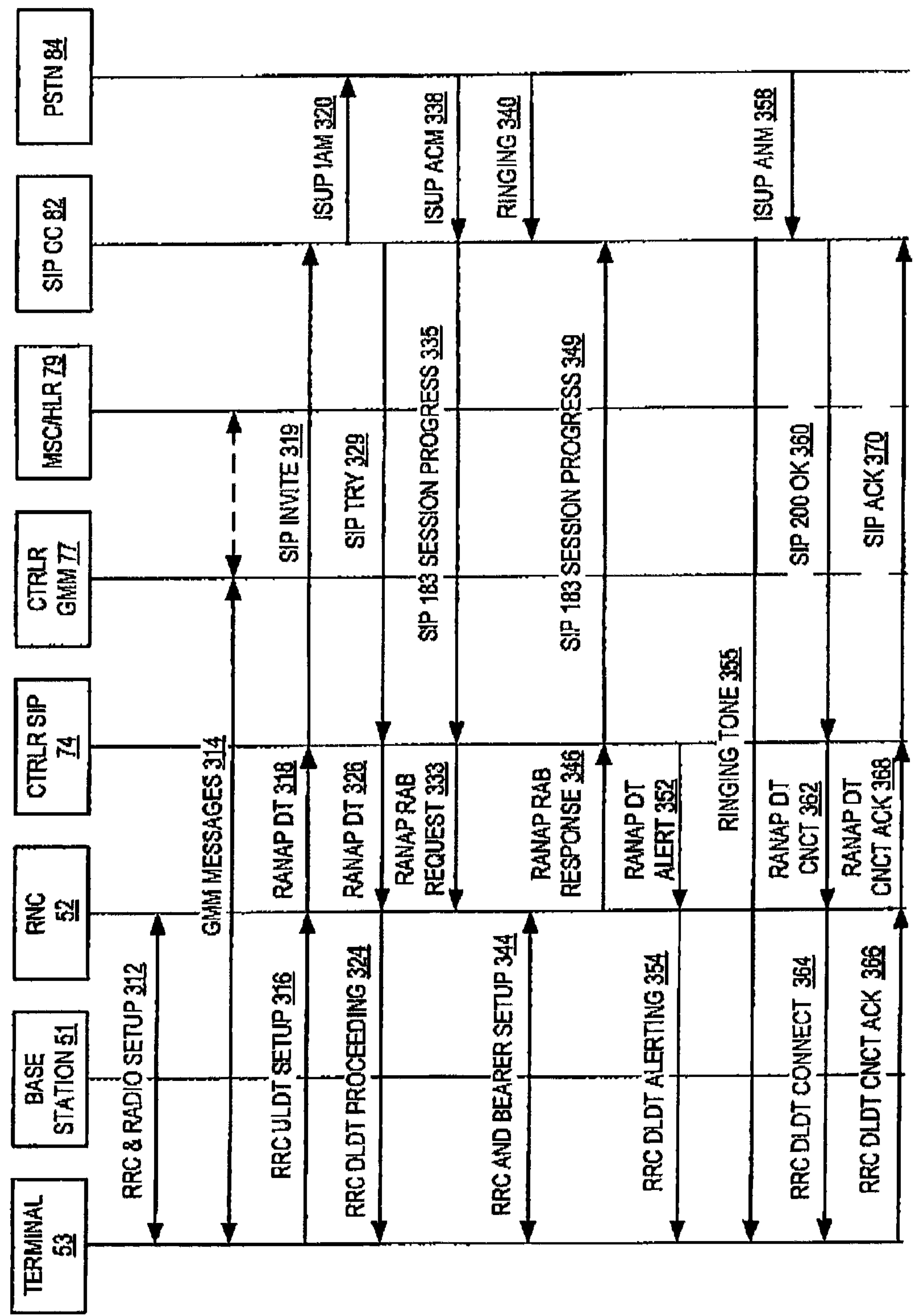
FIG. 4 is a diagram illustrating an example messaging flow in accordance with one embodiment of the invention.
Figure 5:
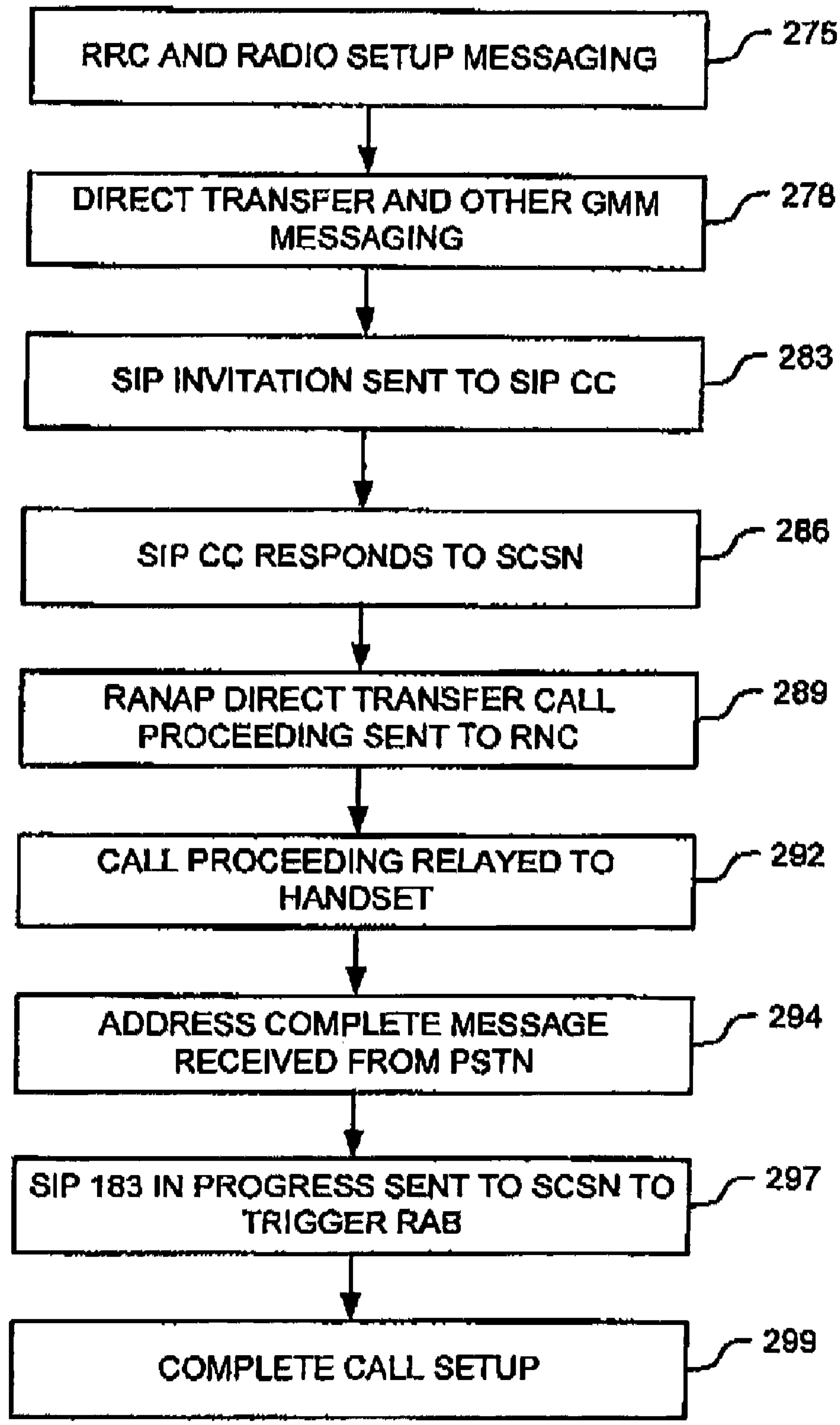
FIG. 5 is a flow diagram illustrating a messaging flow described with reference to FIG. 4.

FIG. 4 is a diagram illustrating an example messaging flow in accordance with one embodiment of the invention. FIG. 5 is a flow diagram illustrating a messaging flow described with reference to FIG. 4. Referring now to FIG. 4, in this example, the example message flow is described with reference to a network architecture similar to that described above with reference to FIG. 1. Particularly, this network architecture includes an example user terminal 53 or handset communicating via a femtocell access point or base station 51 that is configured to communicate with a radio network controller 52. Also included in this example are a multimedia network controller such as a SIP (session initiation protocol) controller 74; a GMM (GSM or GPRS mobility management) controller 77; an MSC (mobile switching center) HLR (home location register) switching center 79; a multimedia call control entity such as a SIP call controller 82; and the public switched telephone network (PSTN) 84. The call controller can include other multimedia call control entities such as, for example, a Proxy Call State Control Function (P-CSCF) an IP PBX, an IP Multimedia Subsystem (IMS), a Centrex controller, and so on. Although the example here is described in terms of establishing a SIP session with a SIP call controller and PSTN entities, after reading this description, one of ordinary skill in the art will understand how to implement IMS and other like sessions with other multimedia controllers and entities and other messaging protocols.

Referring now to FIGS. 4 and 5, in a step 275, 3 G radio resource control (RRC) and radio setup messages 312 are exchanged between the user terminal 53 and the radio network controller 52. In some embodiments, this can be accomplished using conventional RRC and radio setup messages. For example, the user equipment 73 reads the RRC system information that is broadcast on the broadcast control channel (BCCH), and sends an RRC connection request over the common control channel (CCCH), which contains, for example, initial user equipment identity and an establishment cause. The controller 52 responds with an NBAP radio link setup request sent to the base station 51, or NodeB, to provide information such as the cell ID, TFS, TFCS, frequency, an uplink scrambling code, and other information to the NodeB base station 51.

NodeB 51 allocates resources, and starts PHY reception. It provides a response to the radio network controller 52, that includes transport layer addressing information, which includes defining identity of the AAL2 Iub data transport bearer. The NodeB 51 and the RNC 52 perform uplink and downlink synchronization and once synchronized, the base station 51 can begin the downlink transmission. Then, an RRC connection setup message is sent on the common control channel (CCCH) with parameters used to establish CCH. Once the user terminal 53 establishes the radio link, the base station 51 sends a radio link restore indication to the radio network controller. Then, the user equipment 53 sends an RRC setup connection complete message across the common control channel to the radio network controller.

At operation 278, a GMM messaging sequence 314 occurs. This messaging occurs between and among the user equipment 53, the radio network controller 52, and the GMM controller 77. These messages are also exchanged between the GMM controller 77 and the mobile switching center/home location register 79 as a proxy as illustrated by dashed line 315. In this process, a direct transfer service request and direct transfer authentication requests and responses (uplink and downlink direct transfer) are exchanged. These can be in the form of RRC requests and responses between the user equipment 53 and radio network controller 52, and RANAP DT (Radio Access Network Application Part Direct Transfer) messages between radio network controller 52 and the GMM controller 77.

The GMM controller 77 then sends a RANAP security mode command to the controller 52, which converts it to an RRC security mode command and forwards it to the user equipment 53. The user equipment 53 responds with an RRC security mode complete message to the radio network controller 52, which creates an RANAP security mode command to be sent to the GMM controller 77.

Then, the TMSI (Temporary Mobile Subscriber Identity) or TIMSI (Temporary International Mobile Subscriber Identity) is sent from the GMM controller 77 to the user equipment 53 by way of radio network controller 52 to reallocate the TMSI to the user equipment 53. In response, the user equipment 53 replies with an RRC UL DT response indicating that the TMSI (or TIMSI) reallocation is complete. This is forwarded to the GMM controller 77 by the radio network controller 52.

In step 283 RRC call setup messaging occurs resulting in SIP invitation to the SIP CC 82. Particularly, in one embodiment, the user equipment 53 sends an RRC setup message 316, which is relayed by the controller 52 as a RANAP setup message 318. In one embodiment, the ULDT setup message is a DTAP message (Direct Transfer Application Part), and it is sent to the SIP controller, which translates the DTAP message to a SIP invite 319 and sends the SIP invite to the SIP CC 82 to request participation in a SIP session.

In a step 286, the SIP CC 82 responds with a SIP trying message to indicate the call is in progress. In the illustrated example, the SIP trying message 329 which is translated by the SIP controller 74 into a RANAP call proceeding message 326 which results in an RRC call proceeding message 324 to the mobile terminal 53 as illustrated by steps 289 and 292.

As also illustrated in the example of FIG. 4, an ISDN user part (ISUP) initial address message (IAM) 320 is sent from the SIP CC 82 to the PSTN 84. This results in an ISUP ACM (address complete message) 338. This is illustrated in step 294. ISUP is part of the Signaling System #7, or SS7, which is used to set up calls in Public Switched Telephone Networks. In this example, with the address complete message 338, the SIP CC 82 and generates and SIP 183 session progress message 335, which is sent to the SIP controller. Upon receipt of the SIP 183 session progress message, SIP controller 74 generates an RANAP Radio Access Bearer (RAB) request 333, which is sent to the radio network controller 52. This is illustrated by step 297. Accordingly, in this example, the SIP state is mapped into the construction of a suitable radio access bearer for the SIP session. Illustrated in FIG. 5 is an exchange of RRC and bearer set up messages 344 to complete the radio bearer set up. In some embodiments, common RRC and radio bearer setup messages can be used for radio bearer set up. This can include, for example, NBAP RL reconfiguration messages and DCH-FP sync messages between the radio network controller 52 and the base station 51. This can also include radio bearer set up and response messages between the radio network controller 52 and the user equipment 53. Then, an RANAP RAB response 346 and a SIP 183 session progress message 349 is sent from the SIP controller 74 to the SIP CC 82. Also illustrated in FIG. 4 is the ringing message 340 from the PSTN 84 to the SIP CC 82.

In step 299, the remainder of the call setup messaging is completed. In terms of the illustrated example, the SIP controller 74 sends a RANAP DT alert message 352 to the radio network controller 52, which creates and sends an RRC DLDT alert 354 to the relevant device 53. The SIP call controller 82 sends a ringing tone 355 to the user equipment 53 indicating the called device is being signaled. When the called device answers, the PSTN 84 sends an ISUP ANM or answer message to the SIP call controller 82. In turn, the SIP call controller 82 sends a SIP 200 OK message 360 to the SIP controller 74, which sends a RANAP DT connect message 362 to the radio network controller 52, which creates and sends an RRC DLDT connect message 364 to the relevant device 53. The user terminal 53 responds with an RRC DLDT connect acknowledgement 366 and the radio network controller 52 sends a RANAP DT connect acknowledge 368 to the SIP controller 74, which generates and sends a SIP acknowledge 370 to the SIP call controller 82. Having thus described an example messaging flow in this exemplary environment, one of ordinary skill in the art reading this description will understand how messaging flows can be implemented in other environments to generate a radio access bearer using SIP or IMS triggering from a SIP/IMS or like call controller.

As described in this example, the system comprises a standard R99 WCDMA UE 53, a NodeB 51 and an RNC 52 with some modules that break out the global mobility traffic and call-related flows. For Call Related messages the example described converts the RANAP DTAP messages to SIP messages for processing by a SIP based infrastructure.

Embodiments described herein identify the mapping of an ISUP ACM message to a SIP 183 Session Progress step that triggers a Radio Access Bearer to be constructed in the radio access network. In this example, the RANAP protocol is used but similarly RUA or other protocols could be used. For example, the ISUP ACM message when connected to a SIP call control element could trigger a media gateway to create a specific port for the voice signal to be transferred. This can be encapsulated in a SDP (session description protocol). SDP is well described in the art (RFC3485). In this example, the SDP plus a SIP 183 message trigger following the ISUP ACM (address complete message) are used as the trigger for the radio access bearer. It is noted that the flexibility of SIP allows for other messages with the same SDP to be used to trigger the radio access bearer to be triggered e.g. SIP Invite. One of ordinary skill in the art will understand how to construct the various forms of the message.

As described above, in various embodiments, the systems and methods described herein map a PSTN/SIP state into the construction of a suitable radio bearer for legacy mobiles as the Radio Access Bearer can select a standard circuit-switched bearer to be built in the RAN. This can be accomplished in some embodiments without the need for a client to be built into or embedded in or added on to the handset or other client terminal. Other embodiments include the construction with the same method of a bearer that supports soft-handover i.e. two or more radio bearers to the same UE.

It should be noted that preferred positioning of the SIP message is shown in the above example, but in other embodiments the solution is flexible to timing differences that exist between different network elements and call processing or software processing delays.

Figure 6:
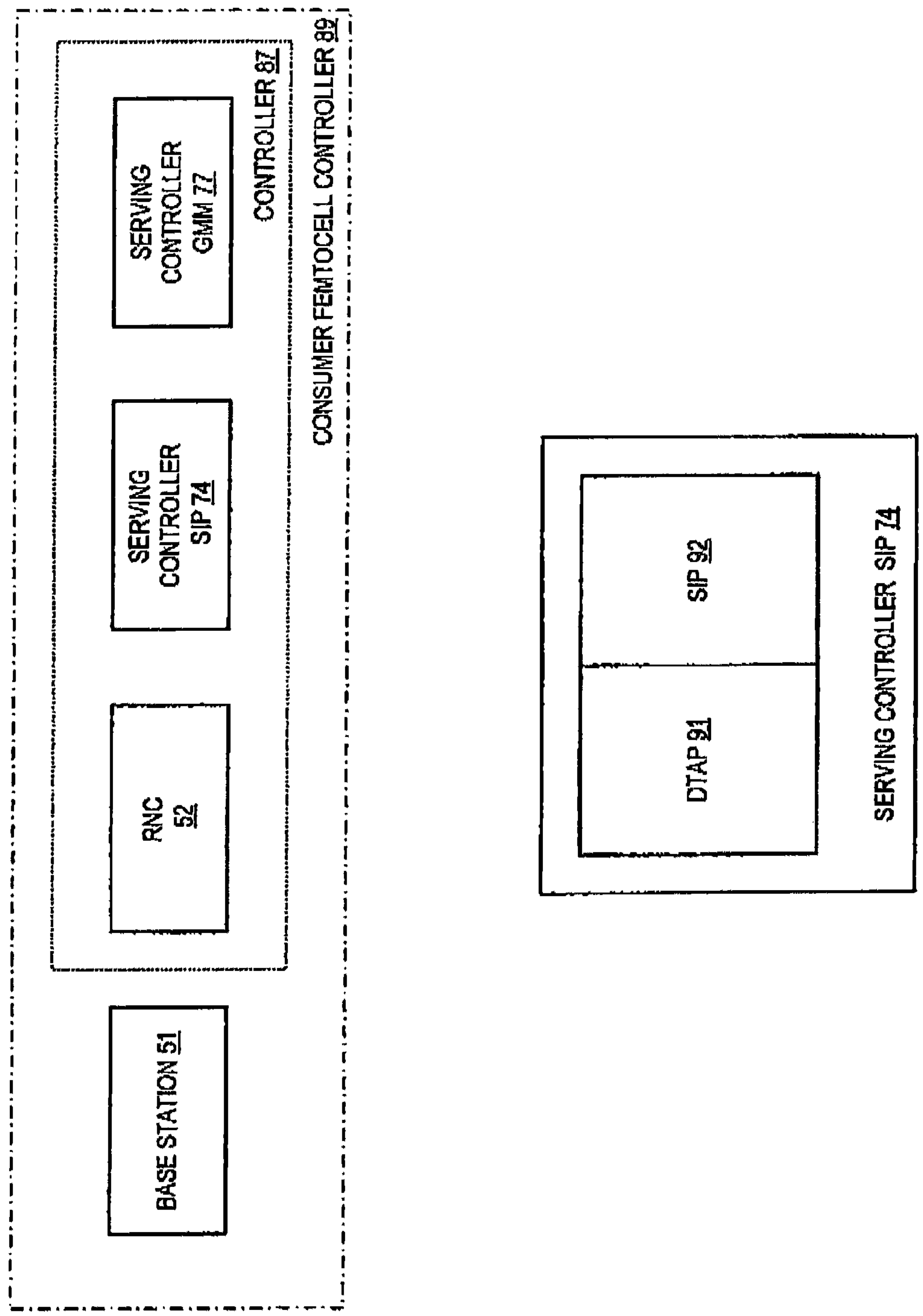
FIG. 6 is a diagram illustrating an example configuration for a controller in accordance with one embodiment of the invention.

FIG. 6 is a diagram illustrating an example configuration for a controller in accordance with one embodiment of the invention. In particular, in the example illustrated in FIG. 6, a consumer femtocell controller 89 is illustrated as including a controller 87 and a base station 51 such as, for example, a Node further in this example, controller 87 is illustrated as including the radio network controller 52, and SIP serving controller 74, and a GMM serving controller 77. This is example illustrates, the controller elements can be packaged or bundled in various configurations to combine functionality for the convenience of the user's or network operators.

With continued reference to FIG. 6, the SIP serving controller 74 is illustrated as including module 91 to perform DTAP (Direct Transfer Access Part) functionality and module 92 to perform SIP or other multimedia functionality. This comports with the example provided above with reference to FIG. 4 wherein SIP controller 74 is implemented to provide communication between DTAP compatible sessions and SIP sessions. Accordingly, because controller 74 can be configured to provide the appropriate message relay, conversion, or creation to allow communication between the radio network controller in one form of session, and the SIP call controller 82.

Figure 7:
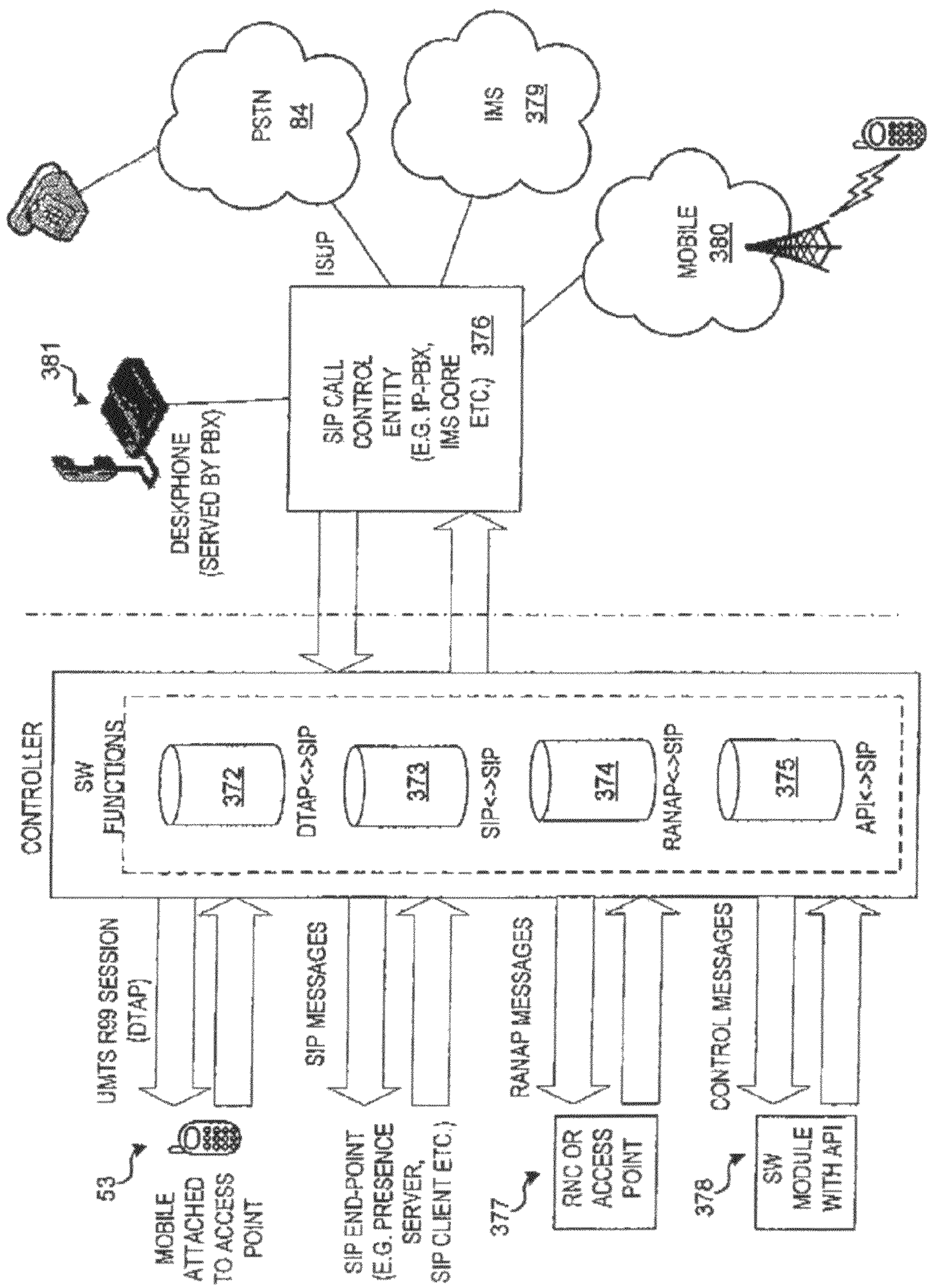
FIG. 7 is a diagram illustrating an example of a controller that can be used to interface between a SIP call control entity such as a SIP call controller 82 and devices operating with other protocols.

As would be apparent to one of ordinary skill in the art after reading this description, protocol or messaging conversion as described in the above example is not limited to DTAP/SIP conversion. Indeed, other protocol or messaging conversions can be performed by a controller such as the SIP controller 74 in accordance with various embodiments of the invention. FIG. 7 is a diagram illustrating an example of a controller that can be used to interface between a SIP call control entity such as a SIP call controller 82 and devices operating with other protocols. FIG. 7 illustrates a controller 371 that includes four functions for interface to various endpoints. These are a DTAP/SIP function, an SIP/SIP function 373, an RANAP/SIP function, 374, and an API/SIP function 375. One or more of these can be provided with controller 371 as may be useful for a given implementation. As described above, DTAP/SIP function 372 can be used to interface equipment such as a mobile terminal 53 attached to an access point 52 via a UMTS R99 session. In this example, the DTAP/SIP functionality 372 performs the messaging conversion and relay between the SIP call control entity such as a SIP call controller 82 and the UMTS equipment. This can be useful for client devices that are not configured as SIP clients.

For SIP clients or other SIP end-point devices, SIP messages can be sent without protocol conversion via SIP/SIP functionality 373. For a radio network controller or access point 377 communicating via RANAP messaging, RANAP/SIP functionality 374 can be utilized to provide compatibility between the RANAP RNC or access point and the SIP call control entity 376. Additionally, API/SIP functionality 375 can be provided to handle control messages from, for example, a software module with an API 378.

While the example provided with reference to FIG. 4 illustrates connection to the public switched telephone network or PSTN, the example of FIG. 7 illustrates that a SIP session can be established with other entities including, for example, IMS 379, mobile networks 380, and PBX-connected devices such as desk phones 381.

Figure 8:
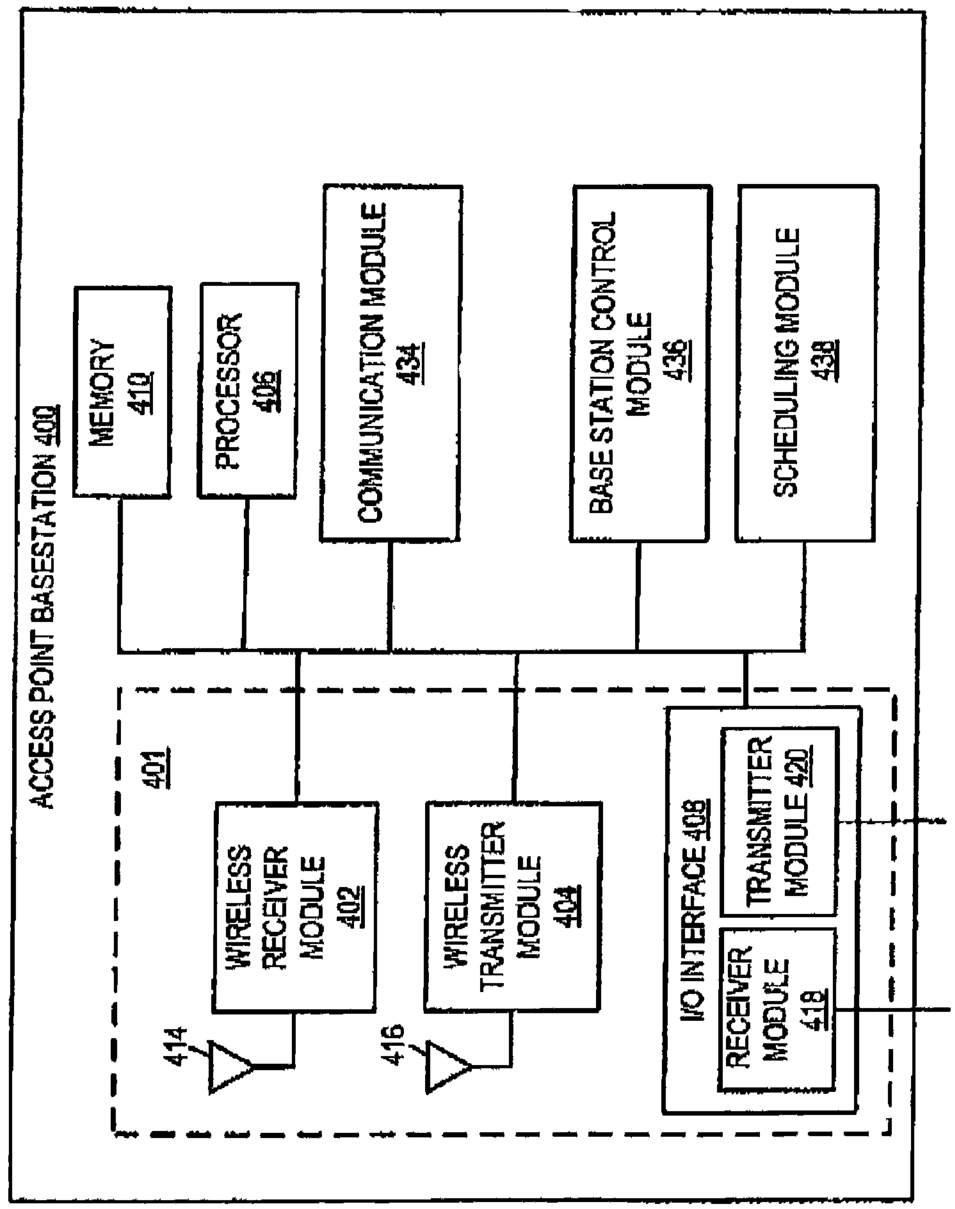
FIG. 8 is a diagram illustrating a block diagram for an example wireless access point or base station in accordance with one embodiment of the invention.

FIG. 8 is a diagram illustrating a block diagram for an example wireless access point or base station in accordance with one embodiment of the invention. In particular, the example architecture illustrated in FIG. 14 shows an embodiment of an access point architecture configured to transmit and receive messages to and from an access point controller over a communication link such as a backhaul, and configured to transmit and receive messages to and from UEs or other wireless terminals.

In this example architecture, the access point 400 includes a communication module 401, a processor 406, and memory 410. These components are communicatively coupled via a bus 412 over which these modules may exchange and share information and other data. Communication module 401 includes wireless receiver module 402, a wireless transmitter module 404, and an I/O interface module 408.

An antenna 416 is coupled to wireless transmitter module 404 and is used by access point 400 to wirelessly transmit downlink radio signals to wireless terminals with which it is connected. These downlink RF signals can include voice and data communications sent to the wireless terminals registered with the access point 400 to allow routine communication operations of the cell. The downlink RF signals can also include control signals such as, for example, uplink power control signals that are sent to registered wireless terminals to allow access point 400 to control the uplink transmit power of the wireless terminals that are communicating with access point 400 as a point of attachment to the cell.

Antenna 414 is included and coupled to wireless receiver module 402 to allow access point 400 to receive signals from various wireless terminals within its reception range. Received signals can include voice and data communications from a wireless terminal in the access point's cell coverage area for routine communication operations. Accordingly, signals such as wireless uplink signals from registered wireless terminals that have a current connection with access point 400 are received. Also, access point 400 typically receives various housekeeping or control signals from wireless terminals such as an uplink pilot signal, for example.

Although two antennas are illustrated in this and other example architectural drawings contained herein, one of ordinary skill in the art will understand that various antenna and antenna configurations can be provided as can different quantities of antennas. For example, transmit and receive functions can be accommodated using a common antenna or antenna structure, or separate antennas or antenna structures can be provided for transmit and receive functions as illustrated. In addition, antenna arrays or other groups of multiple antennas or antenna elements, including combinations of passive and active elements, can be used for the transmit and receive functions.

An I/O interface module 408 is provided in the illustrated example, and can be configured to couple access point 400 to other network nodes. These can include nodes or equipment such as, for example, other access points, and an access controller. In this example architecture, the I/O interface module 408 includes a receiver module 418 and a transmitter module 420. Communications via the I/O interface module can be wired or wireless communications, and the transmitter and receiver contained therein can include line drivers and receivers, radios, antennas or other items, as may be appropriate for the given communication interfaces. Transmitter module 420 is configured to transmit signals that can include voice, data and other communications to the access controller. These are typically sent in a standard network protocol specified for the cellular backhaul.

Receiver module 418 is configured to receive signals from other equipment such as, for example, other access points (in some embodiments, via the access controller), and an access controller. These signals can include voice, data and other communications from the access controller or other equipment. These are typically received in a standard network protocol specified for the cellular backhaul.

Memory 410, can be made up of one or more modules of one or more different types of memory, and in the illustrated example is configured to store data and other information as well as operational instructions such as access point control routines 422. The processor 406, which can be implemented as one or more CPUs or DSPs, for example, is configured to execute instructions or routines and to use the data and information in memory 410 in conjunction with the instructions to control the operation of the access point 400. For example, access point control routines can include instructions to enable processor 406 to perform operations for transferring data between wireless terminals and the access point controller, and for managing communications with and control of wireless terminals.

Accordingly, a communication module 434 can be provided at a femtocell access point to manage and control communications received from other network entities such as a femtocell controller or other access point base stations, and to direct appropriate received communications to their respective destination wireless terminals. Likewise, communication module 434 can be configured to manage received communications from wireless terminals and direct them to their next destination such as, for example to the femtocell controller for transfer to the core network. Communication module 434 can be configured to manage communication of control information sent to and received from wireless terminals. As such, communication module 434 can manage wireless communications such as uplink and downlink communications with wireless terminals as well as wired communications such as those conducted over the Ethernet (or other) backhaul.

A base station control module 436 can be included to control the operation of access point base station 400. For example, the station control module 436 can be configured to implement the features and functionality described above for communicating and transferring information among wireless terminals, other femtocells, and a femtocell controller. A scheduling module 438 can also be included to control transmission scheduling or communication resource allocation. Information that is used by base station control module 436 and scheduling module 430 can also be included in memory 410 such as entries for each active mobile node or wireless terminal, which lists the active sessions conducted by a user and can also include information identifying the wireless terminal used by a user to conduct the sessions.

Figure 9:
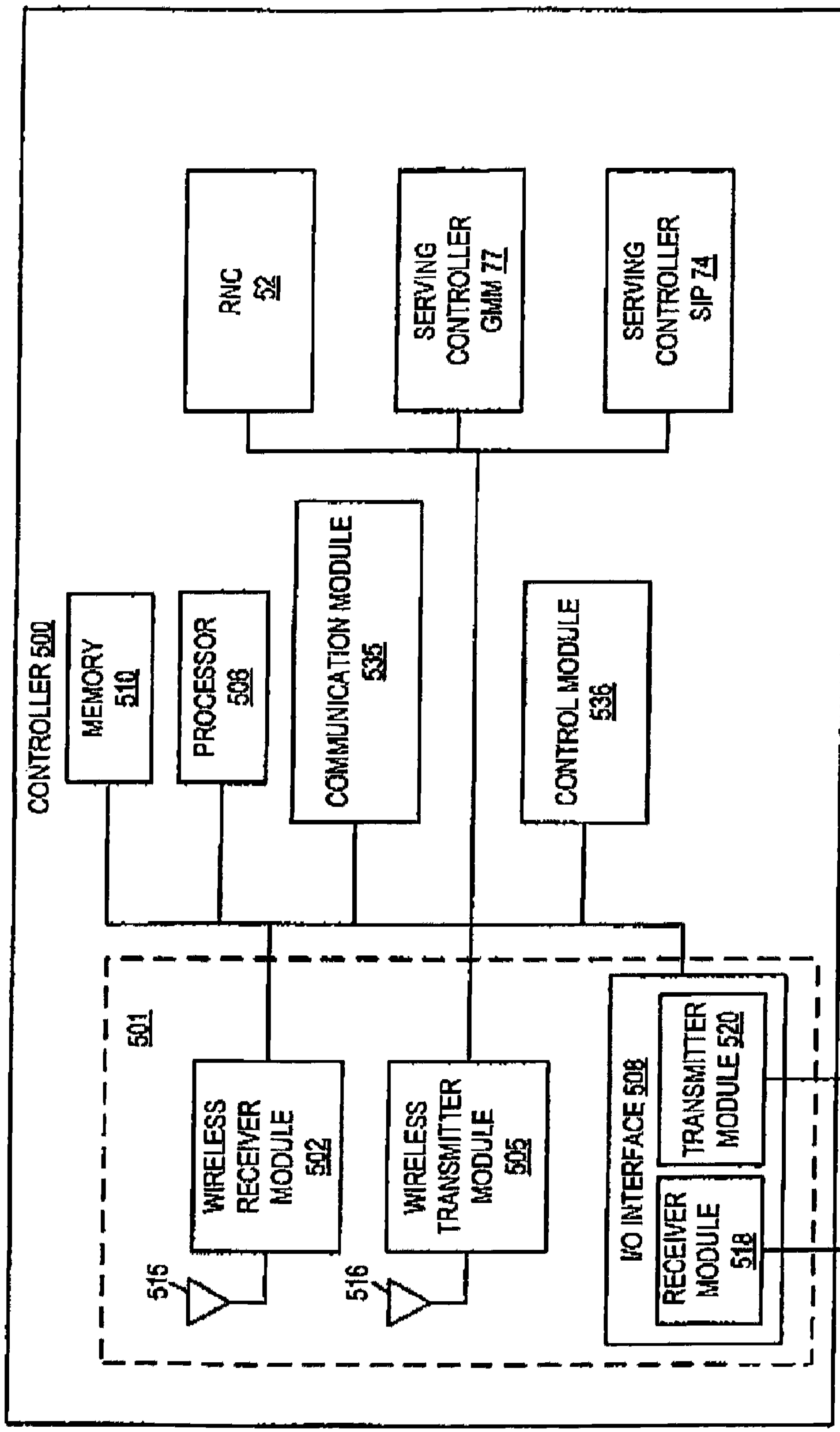
FIG. 9 is a diagram illustrating an example of a controller in accordance with one embodiment of the invention.

FIG. 9 is a diagram illustrating an example of a controller in accordance with one embodiment of the invention. In the example illustrated in FIG. 9, controller 500 is illustrated as having functionality of controller 89 (FIG. 6), which includes functionality of a radio network controller 52, a GMM serving controller 77, and an SIP serving controller 74. As would be apparent to one of ordinary skill in the art after reading this description, the controller of FIG. 9 can include one or more of these controller functionalities. Additionally, the functionality of the base station can be included with the controller to result in a configuration such as the consumer femtocell controller 89 of FIG. 6.

In this example architecture, the controller 500 includes a communication module 501, a processor 506, and memory 510. These components are communicatively coupled via a bus 512 over which these modules may exchange and share information and other data. Communication module 501 includes wireless receiver module 502, a wireless transmitter module 504, and an I/O interface module 508.

An antenna 516 is coupled to wireless transmitter module 504 and is used by the controller 500 to wirelessly transmit signals to other devices. For example, where the controller includes the functionality of the base station 51, transmitter module 504 can be used to transmit downlink radio signals to wireless terminals with which it is connected. These downlink RF signals can include voice and data communications sent to the wireless terminals registered with the access point 500 to allow routine communication operations of the cell. The downlink RF signals can also include control signals such as, for example, uplink power control signals that are sent to registered wireless terminals to allow controller 500 to control the uplink transmit power of the wireless terminals that are communicating with access point 500 as a point of attachment to the cell.

Antenna 514 is included and coupled to wireless receiver module 502 to allow controller 500 to receive signals from various wireless terminals within its reception range. Received signals can include voice and data communications from a wireless terminal such as, for example, where controller 500 includes base station 51 functionality. Accordingly, signals such as wireless uplink signals from registered wireless terminals that have a current connection with controller 500 are received. In addition, in such embodiments, controller 500 can receive various housekeeping or control signals from wireless terminals such as an uplink pilot signal, for example.

Although two antennas are illustrated in this and other example architectural drawings contained herein, one of ordinary skill in the art will understand that various antenna and antenna configurations can be provided as can different quantities of antennas. For example, transmit and receive functions can be accommodated using a common antenna or antenna structure, or separate antennas or antenna structures can be provided for transmit and receive functions as illustrated. In addition, antenna arrays or other groups of multiple antennas or antenna elements, including combinations of passive and active elements, can be used for the transmit and receive functions.

An I/O interface module 508 is provided in the illustrated example, and can be configured to couple controller 500 to other network nodes. These can include nodes or equipment such as, for example, access points or base stations and other controllers. In this example architecture, the I/O interface module 508 includes a receiver module 518 and a transmitter module 520. Communications via the I/O interface module can be wired or wireless communications, and the transmitter and receiver contained therein can include line drivers and receivers, radios, antennas or other items, as may be appropriate for the given communication interfaces. Transmitter module 520 is configured to transmit signals that can include voice, data and other communications to the access controller. These are typically sent in a standard network protocol specified for the cellular backhaul.

Receiver module 518 is configured to receive signals from other equipment such as, for example, base stations and controllers. These signals can include voice, data and other communications from the other equipment.

Memory 510, can be made up of one or more modules of one or more different types of memory, and in the illustrated example is configured to store data and other information as well as operational instructions such as control routines. The processor 506, which can be implemented as one or more CPUs or DSPs, for example, is configured to execute instructions or routines and to use the data and information in memory 510 in conjunction with the instructions to control the operation of the controller 500. For example, control routines can include instructions to enable processor 506 to perform operations as described above for the controller(s), and for managing communications with other entities.

Accordingly, a communication module 534 can be provided to manage and control communications sent to and received from other network entities, including the messaging communications described above. A control module 536 can be included to control the operation of controller 500. For example, the station control module 536 can be configured to implement the features and functionality described above for communicating and transferring information among network entities.

As stated above, a controller 500 can include the functionality of any or all of a radio network controller 52, a GMM serving controller 77, and an SIP serving controller 74. Accordingly, these modules can be included with controller 500 to perform the functionality described above for messaging and call flow. For example, in one embodiment, the serving controller, whether a stand alone controller or whether embedded within a controller 87 or femtocell controller 89 can be configured with modules to perform functions such as receiving a request from a wireless terminal initiating a call event to the network device; generating and sending a multimedia session invitation to a multimedia call control entity requesting a multimedia session with the network device; receiving a multimedia status message from the multimedia call control entity indicating the progress of initiating the multimedia session; and triggering setup of a radio access bearer to handle the multimedia session in response to the multimedia status message.

Figure 10:
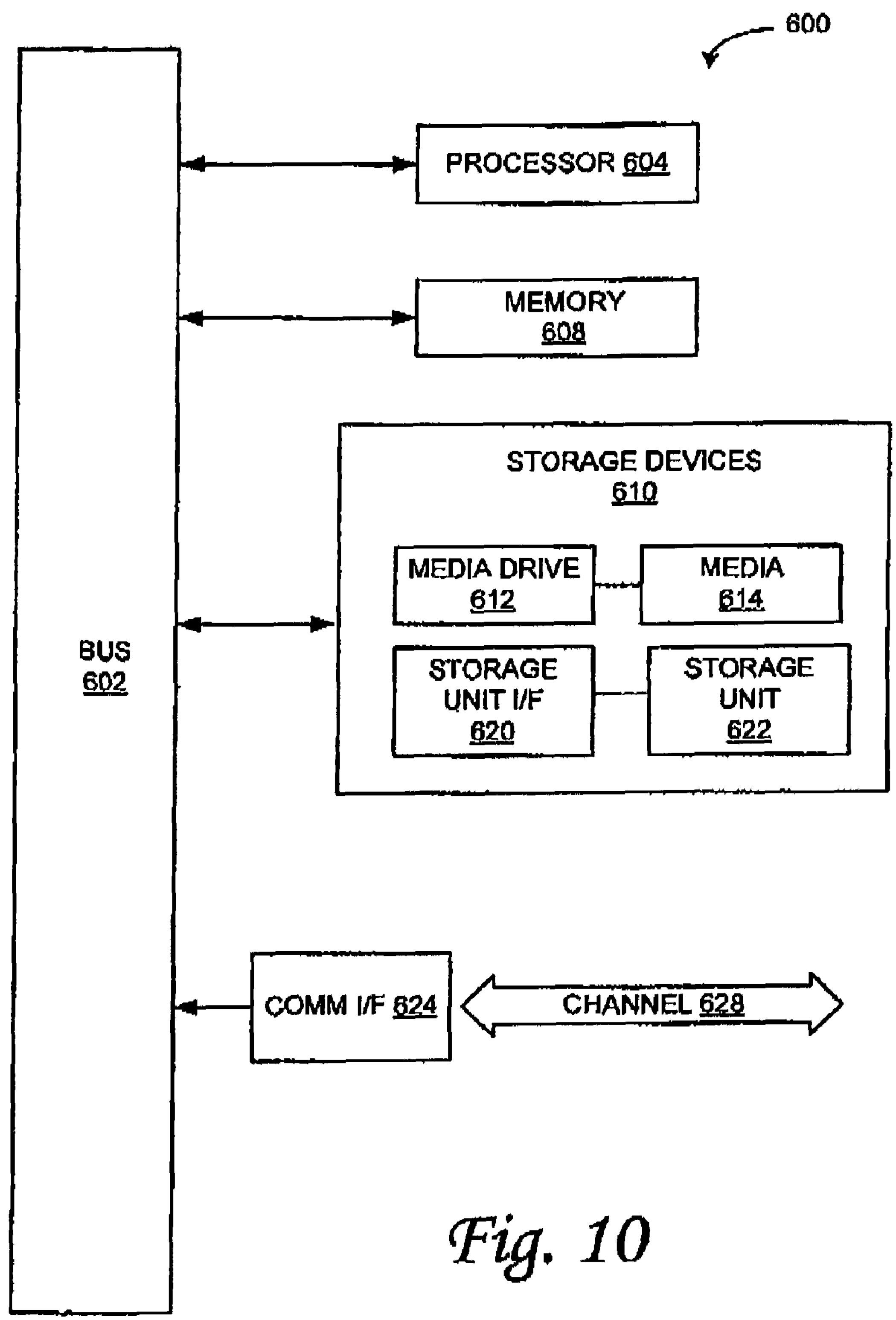
FIG. 10 illustrates an example computing module that may be used in implementing various features of embodiments of the invention.

As used herein, the term module can describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 600. After reading this description, it will become apparent to a person skilled in the relevant art how to implement the invention using other computing modules or architectures.

Referring now to FIG. 10, computing module 600 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for establishing a multimedia session in a network having a first infrastructure between a wireless user terminal and a network device, the method comprising:

a multimedia network controller receiving a request from the wireless user terminal initiating a call event to the network device, the wireless user terminal comprising a legacy device configured for operation in accordance with a second infrastructure;

the multimedia network controller generating and sending a multimedia session invitation to a multimedia call control entity requesting a multimedia session with the network device;

the multimedia network controller receiving a multimedia status message from the multimedia call control entity indicating the progress of initiating the multimedia session; and the multimedia network controller triggering setup of a radio access bearer to handle the multimedia session in response to the multimedia status message.

2. The method of claim 1, wherein the multimedia session comprises an IMS session between the wireless user terminal and the network device, and wherein the IMS session uses the SIP messaging protocol.

3. The method of claim 2, wherein the multimedia status message comprises a SIP 183 session progress message, and receipt of the SIP 183 session progress message triggers setup of the radio access bearer.

4. The method of claim 1, wherein the multimedia call control entity comprises an IP-PBX, an IMS core, a P-CSCF control entity or an IMS control entity.

5. The method of claim 1, wherein the multimedia network controller comprises a module to perform DTAP/SIP messaging, SIP/SIP messaging, RNAP/SIP messaging, or API/SIP messaging.

6. The method of claim 1, wherein the network device comprises a VoIP device, a PSTN device, a mobile device or an IMS device.

7. A multimedia network controller for use in a cellular communication network having a first infrastructure including a plurality of access points serving wireless terminals, the wireless network controller comprising a processor and computer executable program code embodied on a computer readable medium, the second executable program code configured to cause the wireless network controller to perform the operations of receiving a request from a wireless terminal initiating a call event to the network device, the wireless terminal comprising a legacy device configured for operation in accordance with a second infrastructure;

generating and sending a multimedia session invitation to a multimedia call control entity requesting a multimedia session with the network device;

receiving a multimedia status message from the multimedia call control entity indicating the progress of initiating the multimedia session; and triggering setup of a radio access bearer to handle the multimedia session in response to the multimedia status message.

8. The multimedia network controller of claim 7, wherein the multimedia session comprises an IMS session between the wireless user terminal and the network device, and wherein the IMS session uses the SIP messaging protocol.

9. The multimedia network controller of claim 8, wherein the multimedia status message comprises a SIP 183 session progress message, and receipt of the SIP 183 session progress message triggers setup of the radio access bearer.

10. The multimedia network controller of claim 7, wherein the multimedia call control entity comprises an IP-PBX, an IMS core, a P-CSCF control entity or an IMS control entity.

11. The multimedia network controller of claim 7, wherein the multimedia network controller comprises a module configured to perform DTAP/SIP messaging, SIP/SIP messaging, RNAP/SIP messaging, or API/SIP messaging.

12. The multimedia network controller of claim 7, wherein the network device comprises a VoIP device, a PSTN device, a mobile device or an IMS device.

* * * * *